United States Patent
Yamaguchi

(10) Patent No.: US 11,861,826 B2
(45) Date of Patent: Jan. 2, 2024

(54) IMAGING DATA PROCESSING DEVICE

(71) Applicant: SHIMADZU CORPORATION, Kyoto (JP)

(72) Inventor: Shinichi Yamaguchi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 659 days.

(21) Appl. No.: 17/058,003

(22) PCT Filed: May 30, 2018

(86) PCT No.: PCT/JP2018/020832
§ 371 (c)(1),
(2) Date: Nov. 23, 2020

(87) PCT Pub. No.: WO2019/229897
PCT Pub. Date: Dec. 5, 2019

(65) Prior Publication Data
US 2021/0302369 A1    Sep. 30, 2021

(51) Int. Cl.
*G06T 7/00*    (2017.01)
*G01N 21/64*    (2006.01)

(52) U.S. Cl.
CPC ........... *G06T 7/0012* (2013.01); *G01N 21/64* (2013.01); *G06T 2207/10056* (2013.01); *G06T 2207/10064* (2013.01)

(58) Field of Classification Search
CPC .................. G01N 21/64; G06T 7/0012; G06T 2207/10056; G06T 2207/10064
See application file for complete search history.

(56) References Cited

U.S. PATENT DOCUMENTS 8,119,982 B2 *   2/2012   Kajihara ............ G01N 33/6848
                                                                250/281
2004/0136584 A1   7/2004   Acar et al.
(Continued)

FOREIGN PATENT DOCUMENTS

| JP | 2009-025275 A | 2/2009 |
| JP | 2013-257282 A | 12/2013 |
| WO | 2017/002226 A1 | 1/2017 |

OTHER PUBLICATIONS

"iMScope TRIO—Imaging mass microscope—Superimposition of optical image and MS imaging mass spectrometry," [online] [Searched on Mar. 20, 2018], Shimadzu Corporation, pp. 1-5.
(Continued)

*Primary Examiner* — Sean M Luck
(74) *Attorney, Agent, or Firm* — Sughrue Mion, PLLC

(57) ABSTRACT

At the time of superimposing and aligning a stained image and a mass spectrometric (MS) image obtained for the same sample, an image display processor displays, on the superimposed images, grid lines (62) at the spacing corresponding to an operation of a grid spacing adjustment slider (63). When an operator depresses an image deformation range "SET" button (64), specifies an arbitrary area on the superimposed images with a mouse, and then depresses a "SELECT" button (65), an image deformation range specification receiving section determines an image deformation range. When the operator selects an intersection (grid point) of the grid lines (62) within the image deformation range and performs an operation of moving the intersection point to an arbitrary position, an image deformation processor deforms (Continued)

an image included in the image deformation range in accordance with the operation. The image deformation range can be set irrespective of the grid-line spacing, so that it is possible to perform accurate image deformation in accordance with the amount and range of deformation for each site on the image, and improve work efficiency.

4 Claims, 4 Drawing Sheets

(56) References Cited

U.S. PATENT DOCUMENTS

| | | | | |
|---|---|---|---|---|
| 2007/0114388 A1* | 5/2007 | Ogawa | ............... | H01J 49/0004 250/288 |
| 2011/0127425 A1* | 6/2011 | Kajihara | ............... | H01J 49/004 250/288 |
| 2012/0278037 A1* | 11/2012 | Matsuura | ............... | G01N 1/28 702/173 |
| 2013/0080072 A1* | 3/2013 | Ikegami | ............... | H01J 49/0004 702/23 |
| 2014/0316717 A1* | 10/2014 | Ikegami | ............... | H01J 49/0004 702/23 |
| 2015/0029324 A1* | 1/2015 | Tanabe | ............... | G06T 7/0004 348/79 |
| 2016/0063690 A1* | 3/2016 | Ushiba | ............... | G01N 21/956 382/145 |
| 2016/0160169 A1* | 6/2016 | Paczkowski | ............... | C12Q 1/00 506/10 |
| 2017/0276598 A1* | 9/2017 | Ikuyama | ............... | G06T 7/11 |
| 2018/0197726 A1 | 7/2018 | Yamaguchi | | |

OTHER PUBLICATIONS

Shinobu Paddy, "Multi-modality medical 3D image automatic method Research on (Dissertation_full text)", Kyoto University, Jul. 23, 1999, pp. 1-121.
International Search Report for PCT/JP2018/020832 dated Aug. 28, 2018 [PCT/ISA/210].
Written Opinion for PCT/JP2018/020832 dated Aug. 28, 2018 [PCT/ISA/237].

* cited by examiner

CONVENTIONAL IMAGE
DEFORMATION RANGE

IMAGE DEFORMATION RANGE
OF PRESENT INVENTION

DENSE GRID POINT RANGE

IMAGING DATA PROCESSING DEVICE

CROSS REFERENCE TO RELATED APPLICATIONS

This application is a National Stage of International Application No. PCT/JP2018/020832 filed May 30, 2018.

TECHNICAL FIELD

The present invention relates to an imaging data processing device, such as an imaging mass spectrometer, for processing data obtained for each minute area in a two-dimensional area on a sample to display an image or the like showing a two-dimensional intensity distribution of a specific substance.

BACKGROUND ART

An imaging mass spectrometer is a device capable of obtaining a two-dimensional intensity distribution of ions having a specific mass-to-charge ratio m/z on the surface of a sample such as a piece of a biological tissue, while observing the surface morphology of the same sample with an optical microscope. By using the imaging mass spectrometer to observe a mass spectrometric image of ions derived from a compound characteristically appearing in a specific disease such as cancer, it is possible to grasp the extent of the disease. For these reasons, in recent years, pharmacokinetic analysis of biological tissue sections and research for analyzing differences in compound distribution in each organ or in compound distribution between pathological sites, such as cancer, and normal sites, have been actively conducted using imaging mass spectrometers.

As disclosed in Non Patent Literature 1, the imaging mass spectrometer can create and display a heat map-like image (mass spectrometric image) showing a two-dimensional intensity distribution of a substance having a specific mass-to-charge ratio in a two-dimensional measurement area on a sample. Further, an optical microscopic image of the sample can be obtained with an optical microscope provided together with the imaging mass spectrometer, so that it is possible to create and display an image obtained by superimposing the optical microscopic image and the mass spectrometric image at an arbitrary mass-to-charge ratio. In such a superimposed image, a contour, appearance, and the like of a biological tissue and a two-dimensional distribution of a specific substance are displayed together, so that it is convenient to observe which substance is unevenly distributed or in which portion it gathers in the biological tissue.

Further, the following image has also been created and displayed: an image obtained by superimposing a mass spectrometric image and an optical microscopic image obtained by observing a stained sample or a fluorescence microscopic image obtained by observing a fluorescence labeled sample where the sample is stained or fluorescence labeled in order to reveal a specific site of a biological tissue that cannot be seen with general optical microscopic observation. For example, when a mass spectrometric image and a stained image are desired to be acquired for a sample which is a piece of biological tissue, a measurement (imaging) is performed in the following procedure.

First, an operator applies a matrix substance for matrix-assisted laser desorption/ionization (MALDI) to the surface of a target sample and performs a measurement using an imaging mass spectrometer to collect mass spectrometric imaging data. Next, the operator takes the sample out of the device and removes the matrix on the sample surface with an appropriate solvent. The sample is then stained with an appropriate staining reagent and observed with an optical microscope to collect stained image data. The mass spectrometry is performed before the optical observation because the stained sample cannot be subjected to accurate mass spectrometry due to the influence of the staining reagent.

When the mass spectrometric image based on the mass spectrometric imaging data thus collected is superimposed on a reference image, which is a stained image based on the stained image data, the mass spectrometric image and the reference image generally dislocate slightly from each other even at the same position on the sample. This is because, in addition to the positional deviation when the sample is set in the device, the solvent used at the time of removing the matrix on the sample surface deforms a part of the tissue or the like of the sample. Therefore, in many cases, the reference image and the mass spectrometric image cannot be superimposed as they are, and it is necessary to perform image processing such as shifting, rotation, deformation (stretch or shrink) and trimming on at least one of the images before performing superimposition (cf. Patent Literatures 1 to 3, etc.).

Although attempts have been made to automatically execute alignment of the images as described above, it is difficult to mechanically determine whether the images corresponding to a certain site in a biological tissue align each other. Thus currently the operator performs the image alignment by manual operation. At the time of the image alignment processing by the manual operation, for example, when the operator performs a predetermined operation, grid lines are superposed on the reference image and displayed. The intersection of the grid lines is a point that the operator can instruct to move. The operator selects and activates an arbitrary intersection with a pointing device, such as a mouse, and moves the intersection to a desired position on the image. Then, the image in a predetermined range substantially centered at the position of the intersection before the movement is deformed nonlinearly.

In general, when an intersection of the grid lines is selected and moved, the range in which the image is deformed is in the range surrounding the selected intersection and within the border connecting the closest intersections. Generally, the desired amount and range of deformation often vary depending on the area in one image. In such a case, in order to perform the image deformation such that the images match each other properly at various positions, it has been necessary for the operator to carry out operations by trial and error while changing the spacing of the grid lines in accordance with the desired range of deformation. It took time to properly adjust the image position, resulting in poor work efficiency. In addition, such work has been a great physical and mental burden for the operator.

Note that these problems are not limited to the superimposition of a stained image, a fluorescent image, or a general optical microscopic image with a mass spectrometric image but more or less occur in the superimposition of images obtained by different measurement methods. Specifically, the measurement method is, for example, infrared imaging, laser Raman spectroscopic imaging, a surface analysis method using X-rays, ion beams, electron beams, or the like.

CITATION LIST

Patent Literature

Patent Literature 1: JP 2009-25275 A
Patent Literature 2: WO 2017/002226 A
Patent Literature 3: JP 2013-257282 A

NON PATENT LITERATURE

Non Patent Literature 1: "iMScope TRIO—Imaging mass microscope—Superimposition of optical image and MS imaging mass spectrometry," [online], [Searched on Mar. 20, 2018], Shimadzu Corporation, Internet Non Patent Literature 2: "Study on automatic alignment method for multimodality medical three-dimensional images," Shinobu Mizuta, [online], [Searched on Mar. 20, 2018], Kyoto University, Internet

SUMMARY OF INVENTION

Technical Problem

The present invention has been made to solve the above problems, and an object of the present invention is to provide an imaging data processing device capable of improving operability by facilitating an operator's operation for deforming an image when one image is deformed in order to superimpose an optical microscopic image, a mass spectrometric image, or the like.

Solution to Problem

A first aspect of the present invention, which has been made to solve the above problems, is an imaging data processing device that has an input unit and a display unit as user interfaces and processes first imaging data obtained by performing a measurement on a plurality of minute areas in a two-dimensional area on a sample by a first measurement method, and second imaging data obtained by performing a measurement on a range including at least a part of the two-dimensional area on the sample by a second measurement method different from the first measurement method, the device including:

a) an image display processor configured to superimpose and display a first image created on the basis of the first imaging data and a second image created on the basis of the second imaging data over substantially the same range on a sample in a screen of the display unit, and superpose and display grid points at predetermined spacing on the superimposed images;

b) a deformation range specification receiving section configured to allow a user to specify an image deformation range by an operation via an input unit on the superimposed images with the grid points superposed and displayed by the image display processor; and c) an image deformation processor configured to accept the user's selection of a grid point included in the image deformation range specified by the deformation range specification receiving section from among the grid points superposed and displayed on the superimposed images by the image display processor via the input unit and the user's operation of moving the selected grid point on the superimposed images, the processor being configured to deform, in accordance with the selection and the moving operation, an image within the image deformation instructed range in one of the two images that are superimposed and displayed.

In the present invention, the first and second measurement methods can be any of mass spectrometric imaging, Raman spectroscopic imaging, fluorescence imaging, infrared spectroscopic imaging, X-ray analytical imaging, surface analytical imaging using particle beams such as electron beams and ion beams, surface analytical imaging using a probe such as a scanning probe microscope (SPM), and microscopic observation using a general microscope such as an optical microscope.

In the first aspect of the present invention, when acquiring first and second imaging data, the image display processor creates a first image on the basis of the first imaging data and creates a second image on the basis of the second imaging data. The two images for substantially the same area of the same sample are superimposed and displayed in the screen of the display unit. Grid points at a predetermined spacing are superposed on the superimposed images and displayed. The grid points may be intersections of grid-like lines (grid lines) or simply a plurality of points arranged discretely in a grid. The grid lines connecting the respective grid points need not be displayed, but the whole or a part of the grid lines may be displayed so as to make the relative positions of the respective sites on the image easy to grasp. In the case of displaying grid points on superimposed images in which the two images are superimposed, the user may be enabled to select one of the two images to be deformed. Further, the user may be enabled to specify or adjust the spacing between the grid points to be superposed and displayed.

The deformation range specification receiving section accepts the operation of the input unit by the user and determines an image deformation range on the superimposed images where the grid points are superposed and displayed. Typically, the input unit is a pointing device such as a mouse. An area of arbitrary size and shape specified on the image may be set as an image deformation range. The image deformation processor recognizes the image deformation range as an image deformation processing object. Then, when the user selects one of the grid points included in the image deformation range from among the grid points on the image by using an input unit and then performs an operation of moving the selected grid point to an arbitrary position, in accordance with the operation, the image deformation processor moves minute images at the positions of the corresponding grid points before the movement on the image to be deformed to the positions of the grid points after the movement, and moves the minute image corresponding to the position of each grid point within the image deformation range including the grid point before the movement according to a predetermined algorithm, thereby deforming the entire image within the image deformation range.

By performing the image deformation processing as described above one or more times by the operation of the user, the aligned superimposed images are displayed on the screen of the display unit. Since the range of deformation to be performed in accordance with one operation of moving the grid point can be arbitrarily specified, by appropriately adjusting the image deformation range in accordance with the desired range and amount of deformation in one image, accurate image alignment can be performed with fewer times of operations than in the prior art.

A second aspect of the present invention, which has been made to solve the above problems, is an imaging data processing device that has an input unit and a display unit as user interfaces and processes first imaging data obtained by performing a measurement on a plurality of minute areas in a two-dimensional area on a sample by a first measurement method, and second imaging data obtained by performing a measurement on a range including at least a part of the two-dimensional area on the sample by a second measurement method different from the first measurement method, the device including:

a) an image display processor configured to superimpose and display a first image created on the basis of the first imaging data and a second image created on the basis of the second imaging data over the substantially same range on a sample in a screen of the display unit, and superpose and display grid points on the superimposed images;

b) a grid-point spacing specification receiving section configured to allow a user to specify spacing between the grid points for each of different areas on the superimposed images; and c) an image deformation processor configured to accept the user's selection of a grid point among grid points having spacing specified by the grid-point spacing specification receiving unit and superposed and displayed on the superimposed images by the image display processor, and the user's operation of moving the selected grid point on the image, the processor being configured to deform, in accordance with the selection and the moving operation, an image in a predetermined range in one of the two images that are superimposed and displayed.

In the second aspect of the present invention, the grid-point spacing specification receiving section accepts the operation of the user through the input unit, divides the entire surface of the image on which grid points are superposed and displayed into a plurality of areas, for example, and sets grid-point spacing different (or the same) for each area. That is, it is possible to mix grid points having different grid-point spacing. For example, after grid points having a large first grid-point spacing are first displayed on the entire image, grid points having a second grid spacing smaller than the first grid-point spacing may be provided within one or a plurality of areas each surrounded by three or more grid points of first grid-point spacing that are not located on a straight line.

Similarly to the conventional grid points having uniform spacing, the image deformation processor accepts selection of an arbitrary grid point from among many grid points with spacing varying depending on the area, and an operation of moving the selected grid point on the image, and deforms the image in accordance with the operations. The range of the image to be deformed in accordance with the operation of one intersection may be narrowed in an area where the grid-point spacing is narrow, and the range of the image to be deformed in accordance with the operation of one grid point may be widened in an area where the grid-point spacing is wide. Thus, by appropriately adjusting the grid-point spacing and the range in which the grid points having the spacing are provided in accordance with the desired range and amount of deformation in one image, accurate alignment can be performed with fewer times of operations than in the prior art.

As described above, various measurement methods can be adopted as the first and second measurement methods in the present invention. The present invention is particularly effective in cases where it is difficult to achieve sufficiently accurate alignment by simple movement, rotation, or expansion and contraction. Therefore, in the present invention, the first measurement method can be mass spectrometric imaging using matrix-assisted laser desorption/ionization, and the second measurement method can be a method of staining or fluorescently labeling a sample and then observing the sample with a microscope.

Advantageous Effects of Invention

According to the present invention, for example, when one of a stained image or a fluorescence microscopic image and a mass spectrometric image for the same sample is deformed in order to accurately superimpose those images, the operator's operation for deforming the image can be facilitated to improve operability. It is thereby possible to improve the efficiency of the image alignment work and reduce the physical and mental burden of the operator.

DESCRIPTION OF EMBODIMENTS

Hereinafter, an embodiment of an imaging mass spectrometer including an imaging data processing device according to the present invention will be described with reference to the accompanying drawings.

Figure 1:
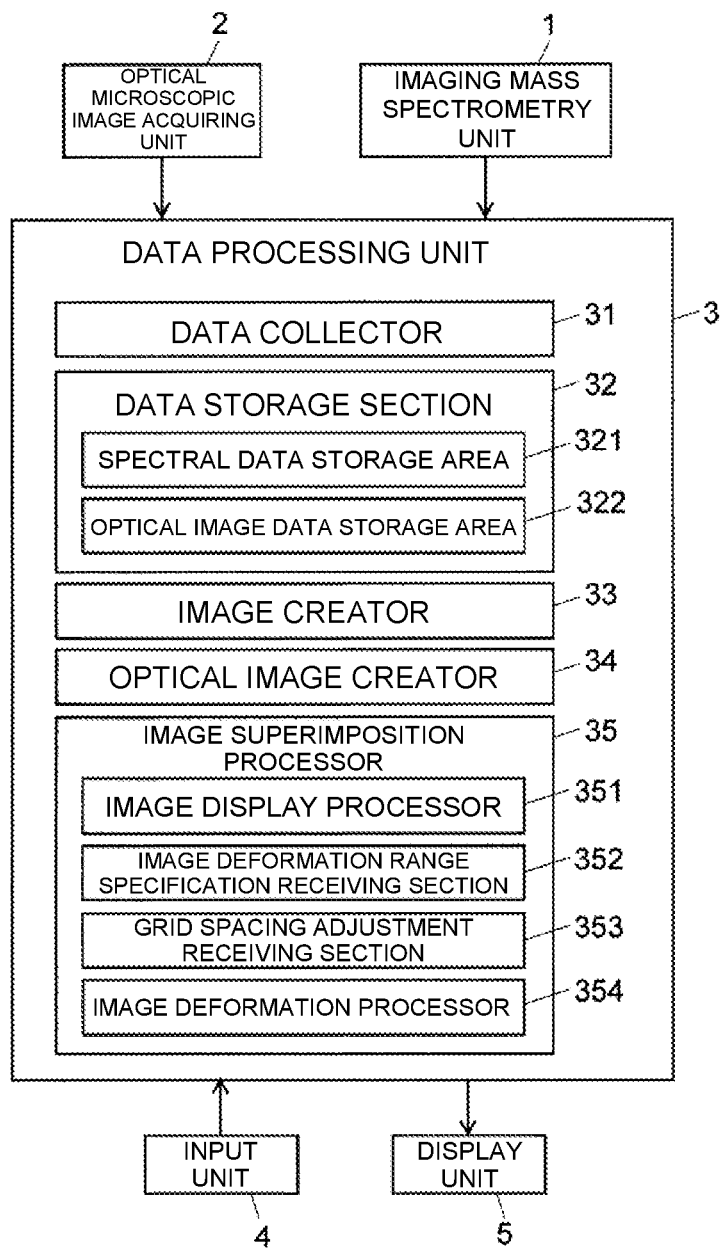
FIG. 1 is a schematic block diagram of an embodiment of an imaging mass spectrometer including an imaging data processing device according to the present invention.

FIG. 1 is a schematic block diagram of an imaging mass spectrometer according to the present embodiment.

The imaging mass spectrometer of the present embodiment includes an imaging mass spectrometry unit 1 for performing a measurement on a sample by mass spectrometric imaging, an optical microscopic image acquiring unit 2 for taking an optical microscopic image on the sample, a data processing unit 3, and an input unit 4 and a display unit 5 which are user interfaces.

The imaging mass spectrometry unit 1 includes, for example, a matrix-assisted laser desorption/ionization (MALDI) ion trap time-of-flight mass spectrometer, and performs mass spectrometry on many minute areas (measurement points) in a two-dimensional measurement area on a sample such as a piece of a biological tissue to acquire mass spectrometric data for each measurement point.

The optical microscopic image acquiring unit 2 is formed by adding an image acquiring unit to an optical microscope and acquires a microscopic image of a two-dimensional area of the surface on a sample. Here, the optical microscopic image acquiring unit 2 is used to acquire an optical microscopic image, which is used for determining a measurement area when a measurement is performed by the mass spectrometric imaging, and to take a stained image of a stained sample.

The data processing unit 3 receives the mass spectral data in each minute area collected by the image mass spectrometry unit 1 and the optical microscopic image data input from the optical microscopic image acquiring unit 2 and performs predetermined processing. The data processing unit 3 includes, as functional blocks, a data collector 31, a data storage section 32, an image creator 33, an optical image creator 34, an image superimposition processor 35, and the like. The data storage section 32 includes a spectral data storage area 321 for storing data collected by measurement by the imaging mass spectrometry unit 1, and an optical image data storage area 322 for storing data collected by measurement (imaging) by the optical microscopic image acquiring unit 2. The image superimposition processor 35 includes, as lower functional blocks, functional blocks such as an image display processor 351, an image deformation range specification receiving section 352, a grid spacing adjustment receiving section 353, and an image deformation processor 354.

In general, the data processor 3 is in fact a personal computer (or a higher-performance workstation), and is configured to execute a function of each of the blocks by operating dedicated software installed in the computer on the computer. In that case, the input unit 4 is a pointing device such as a keyboard or a mouse, and the display unit 5 is a display monitor.

Next, the measurement work for the sample by the imaging mass spectrometer of the present embodiment will be described.

First, when an operator sets a target sample at a predetermined measurement position of the optical microscopic image acquiring unit 2 and performs a predetermined operation with the input unit 4, the optical microscopic image acquiring unit 2 takes an image of the surface of the sample and displays the image on the screen of the display unit 5. The operator (user) instructs the whole sample or a measurement area, which is a part of the sample, on the image by using an input unit 4. The operator takes out a sample once and attaches a matrix for MALDI to the surface of the sample. Then, the operator sets the sample with the matrix attached at a predetermined measurement position in the imaging mass spectrometry section 1, and performs a predetermined operation using the input unit 4. Then, the operator sets the sample 100 with the matrix attached at a predetermined measurement position in the imaging mass spectrometry section 1, and performs a predetermined operation using the input unit 4. This allows the imaging mass spectrometry section 1 to acquire mass spectrometry data over a predetermined mass-to-charge ratio range by performing mass spectrometry on each of the many micro areas in the measurement area indicated as described above on the sample. At this time, the data collector 31 performs so-called profile acquisition, collects profile spectral data, which is a waveform continuous in the direction of the mass-to-charge ratio within the mass-to-charge ratio range, and stores the collected data into the spectral data storage area 321 of the data storage section 32.

When a pattern on a sample surface (borders of different tissues, etc.) can be observed relatively clearly even with the matrix attached to the sample surface, the optical microscopic image acquiring unit 2 may capture an image after the matrix is preliminarily attached to the sample surface.

After the measurement by the mass spectrometric imaging, the operator takes out the sample and removes the matrix attached to the sample surface with a solvent. Then, the sample is stained with a predetermined staining reagent, and the stained sample is set again at a predetermined measurement position of the optical microscopic image acquiring unit 2. When the operator performs a predetermined operation with the input unit 4, the optical microscopic image acquiring unit 2 takes an image of the surface of the sample, and the data collector 31 stores the stained image data obtained by the imaging into the optical image data storage area 322 of the data storage section 32. Thus, the mass spectrometric imaging data and the stained image data for the same sample are stored into the data storage section 32.

Figure 2:
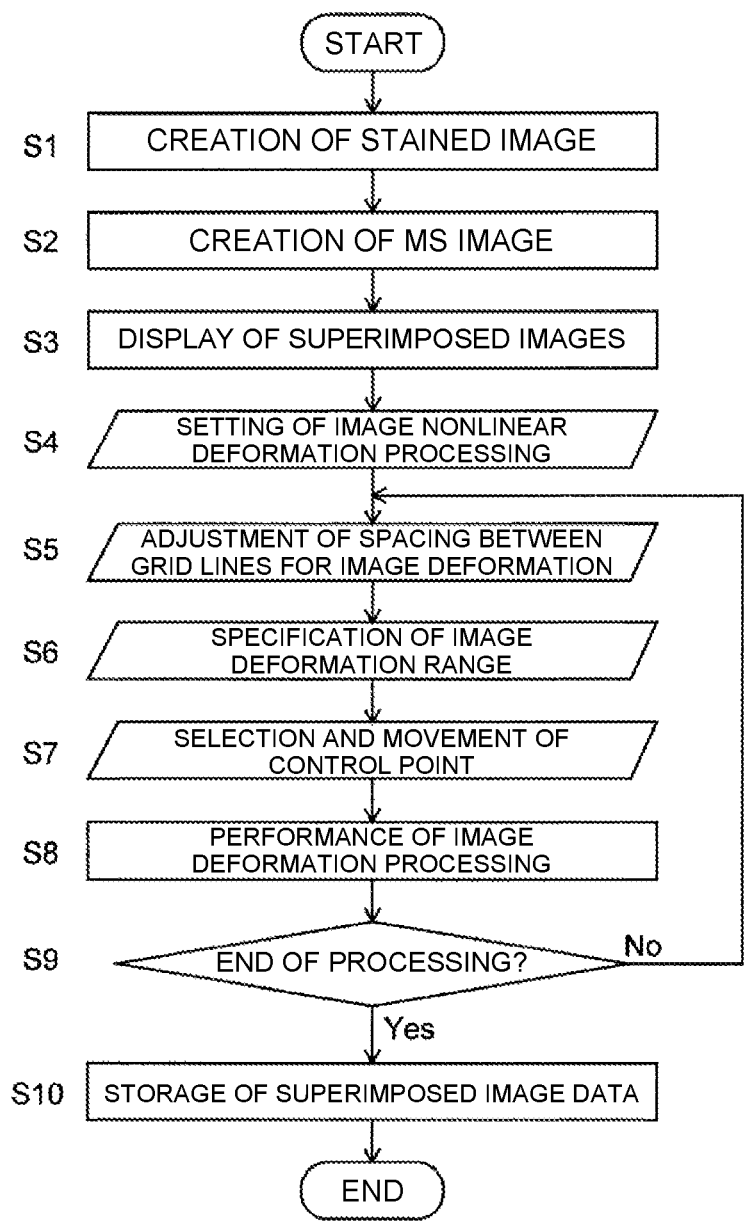
FIG. 2 is a flowchart showing a procedure for image superimposition work in the imaging mass spectrometer of the present embodiment.

Next, with reference to FIGS. 2 to 4A-4B, a description will be given of image superimposition work performed in a state where the above-mentioned data is stored and image deformation processing performed at the time of the image superimposition work. FIG. 2 is a flowchart showing the procedure for the image superimposition work, FIG. 3 is a view showing an example of a display screen at the time of the image superimposition work, and FIGS. 4A-4B are explanatory views of the image deformation processing.

When the operator performs a predetermined operation with the input unit 4, the optical image creator 34 reads out the stained image data from the optical image data storage area 322 of the data storage section 32 and creates a stained image for the sample on the basis of the data (step S1). When the operator specifies a compound having a two-dimensional distribution desired to be confirmed with an input unit 4, the image creator 33 reads out signal intensity value data at a mass-to-charge ratio M corresponding to the specified compound from the spectral data storage area 321 of the data storage section 32 and creates a mass spectrometric image at the mass-to-charge ratio M for the sample on the basis of the data (step S2).

Figure 3:
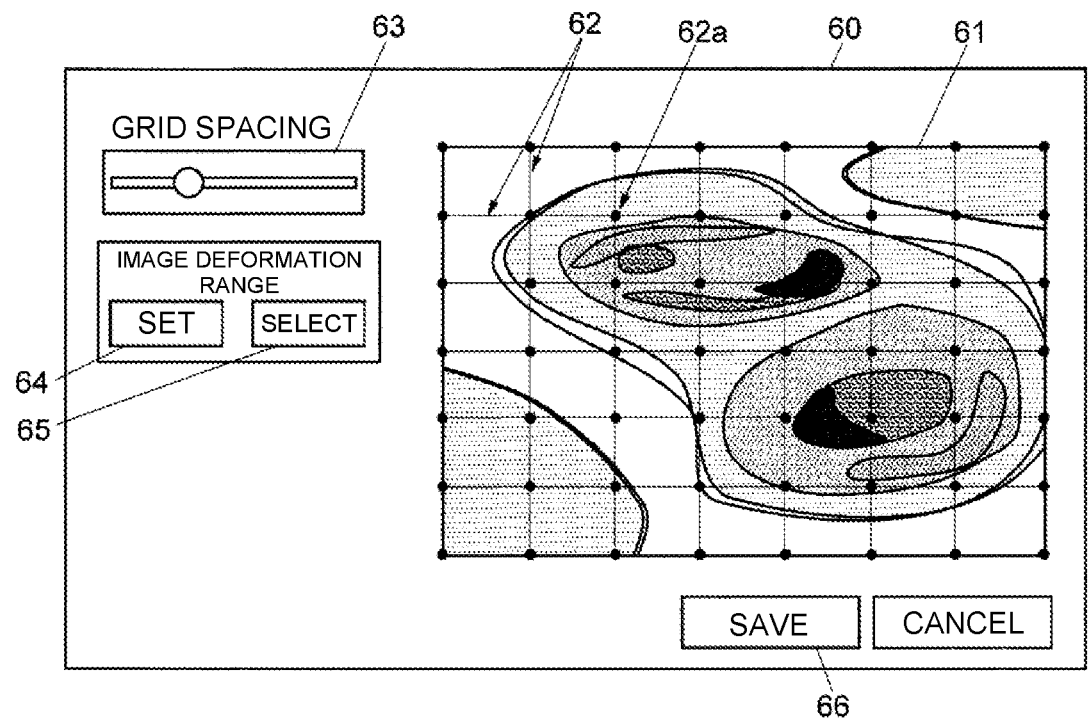
FIG. 3 is a view showing an example of a display screen at the time of the image superimposition work in the imaging mass spectrometer of the present embodiment.
Figure 4A:
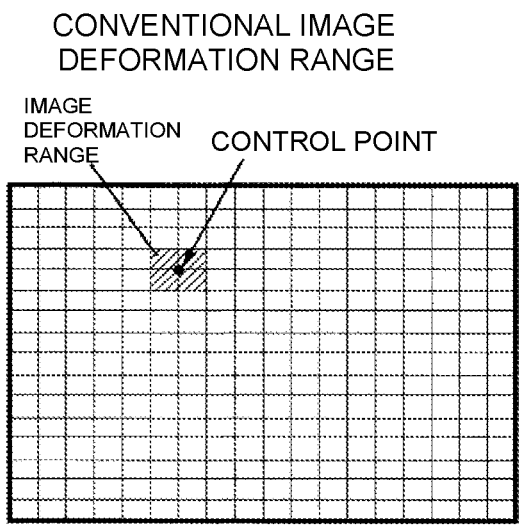
FIGS. 4A-4B are explanatory views of image deformation processing in the imaging mass spectrometer of the present embodiment.
Figure 4B:
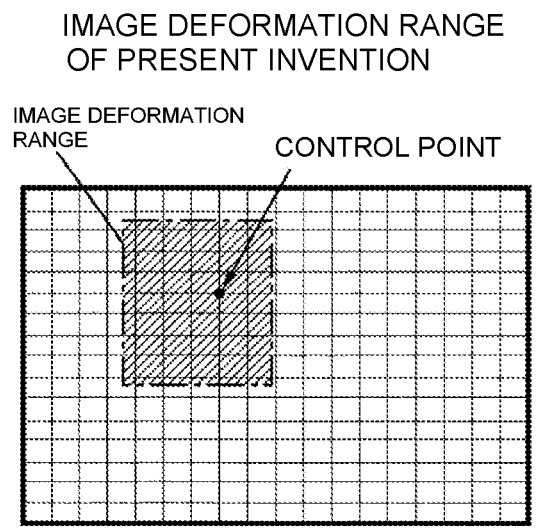

The image display processor 351 displays an image superimposition work screen 60, as shown in FIG. 3, on the screen of the display unit 5 (step S3). The image superimposition work screen 60 is provided with an image display area 61 in which superimposed images, obtained by superimposing a stained image and a mass spectrometric image for the same sample, are disposed. The superimposed images displayed at this time in the image display area 61 are simply superimposed images obtained by making one of the two images translucent, and no image alignment has been performed. In the device of the present embodiment, image alignment by linear image deformation such as affine deformation is also possible, but here, nonlinear image deformation is performed. In the present invention, the stained image out of the two images is deformed, but the operator may be enabled to select an image that is an image deformation target.

When the operator performs a predetermined operation with the input unit 4 to instruct nonlinear image deformation to be performed, the image display processor 351 displays grid lines 62, as shown in FIG. 3, on the entire surface of the superimposed images displayed in the image display area 61 (step S4). Here, an intersection 62a of the vertical and horizontal grid lines 62 is the grid point in the present invention. However, the grid point may be indicated using a cross shape instead of the grid lines, or the grid point may be indicated only by a simple dot. Further, the grid line 62 to be displayed may be different from a simple solid line, such as a dotted line, or the color of the grid line 62 may be made changeable by the operator as appropriate.

A grid spacing adjustment slider 63 is disposed in the image superimposition work screen 60, and when the operator performs an operation of moving a knob of the slider 63 with the input unit 4, the grid spacing adjustment receiving section 353 adjusts the spacing between grid lines 62 displayed on the superimposed images in the image display area 61 in accordance with the operation (step S5). When the operator depresses the image deformation range "SET" button 64 with the input unit 4, the image deformation range specification receiving section 352 is activated to make it possible to specify a desired range on the superimposed images as the image deformation range by using the pointing device. Here, the shape of the image deformation range that can be specified is rectangular, and the size of the range is arbitrary. This range can be set irrespective of the grid lines 62.

FIG. 4B shows an example in which an image deformation range is specified in the image display area 61. The superimposed images are displayed in practice, but is omitted here. Here, the image deformation range can be specified so as to include many (or one) rectangular block(s) surrounded by four adjacent intersections (grid points) 62*a* along the grid lines 62. It is also possible to specify a plurality of image deformation ranges at once. When the image deformation range is determined, the operator depresses an image deformation range "SELECT" button 65 with the input unit 4, whereby the image deformation range specification receiving section 352 determines the image deformation range set on the image at that time. Here, the image deformation range has the rectangular shape, but it may be possible to form the image deformation range into an arbitrary shape, for example, by moving a cursor with the pointing device and taking the range surrounded by the locus of the cursor as the image deformation range.

Next, the operator selects one of the intersections 62*a* of the grid lines 62 on the image in the image display area 61, that is, one grid point, as a control point by clicking with the pointing device, and then performs an operation of dragging and dropping the control point in an arbitrary direction and to an arbitrary position (step S7). The image deformation processor 354 accepts this operation, and nonlinearly deforms the stained image within the image deformation range according to a predetermined algorithm when the control point is within the image deformation range. On the other hand, when the selected control point is out of the image deformation range, as shown in FIG. 4A, the image deformation processor 354 sets the four rectangular blocks surrounding the control point as the image deformation range and nonlinearly deforms the stained image within the image deformation range according to the predetermined algorithm (step S8). That is, in the latter case, the image deformation range is automatically determined in accordance with the spacing between the grid lines as in the conventional device, whereas in the former case, the image deformation range can be arbitrarily determined by the operator.

Then, the operator confirms whether the position of the stained image after the deformation and the position of the mass spectrometric image are matched on the displayed image (step S9) and returns from step S9 to step S5 when image deformation is required. Then, by repeating steps S5 to S9, the accuracy of the alignment between the stained image and the mass spectrometric image is gradually increased, and when the operator determines that the deviation has reached an acceptable level, the processing proceeds from step S9 to step S10, and the operator depresses the "SAVE" button 66 with the input unit 4. Thus, the image display processor 351 stores the data constituting the superimposed images at that time into the data storage section 32.

As the algorithm for the image deformation described above, a well-known method disclosed in various documents such as Non Patent Literature 2 may be used, and only the image deformation range is different between FIGS. 4A and 4B. In the case of FIG. 4A, with the image deformation range being limited by the grid-line spacing, the grid-line spacing needs to be widened when the image is desired to be deformed greatly. Then, the control points cannot be set finely. On the other hand, for setting the control points finely, the grid-line spacing needs to be narrowed, and then, the range in which the image is deformed is limited considerably.

In contrast, in the case of FIG. 4B, the grid-line spacing and the image deformation range are not related to each other, whereby the image deformation range can be widened to deform a wide range on the image at once, while the grid-line spacing can be narrowed so as to set the control points finely. Also, when there is a portion on the image, which is not desired to be deformed, at a position relatively close to the control point, the image deformation range can be set so as to exclude the portion. Thus, the image alignment can be efficiently performed such that the same site on the sample is at the same position on the two images that are superimposed.

In the above embodiment, it has been possible to set the image deformation range irrespective of the spacing between the grid lines that are for setting the control point on the image, but as shown in FIG. 3, the spacing between the grid lines displayed on the superimposed images is constant. In contrast, as in the embodiment described below, when the spacing between the grid lines displayed on the superimposed images is not one type but a plurality of types of grid-line spacing can be mixed, effects similar to those of the above embodiment can be obtained.

Figure 5A:
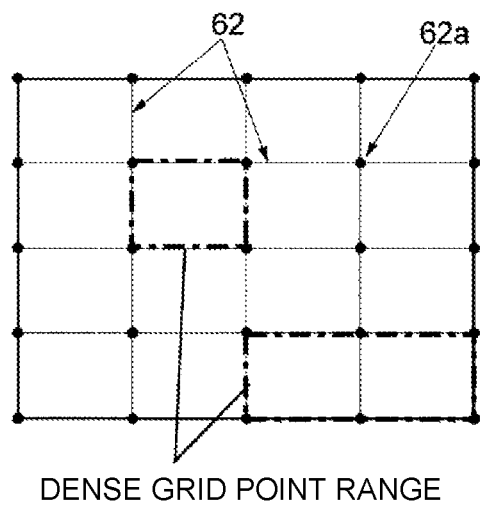
FIGS. 5A-5B are explanatory views of image deformation processing in an imaging mass spectrometer of another embodiment.
Figure 5B:
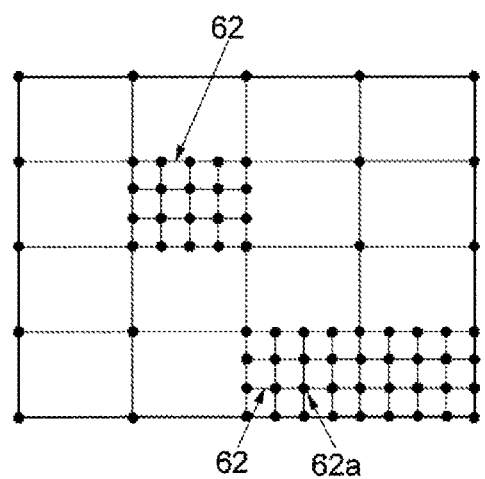

FIGS. 5A-5B are explanatory views of image deformation processing in an imaging mass spectrometer according to another embodiment of the present invention.

FIGS. 5A-5B are views showing grid lines 62 displayed on superimposed images (not shown) displayed in the image display area 61 as in FIGS. 4A-4B. In the imaging mass spectrometer of the present embodiment, first, as shown in FIG. 5A, the operator sets the grid lines 62 having relatively coarse grid-line spacing and thereafter specifies, as dense grid point range, one or more blocks having a rectangular shape (or any two-dimensional shape connecting a plurality of intersections 62*a*) formed by the grid lines 62. Then, the operator further sets a dense grid-line spacing within the dense grid point range.

As in the above embodiment, since the intersection 62*a* of the vertical and horizontal grid lines 62 is a grid point, setting the grid-line spacing is substantially the same as setting the grid-point spacing. That is, in the present embodiment, it is possible to set the grid-point spacing in two stages of being coarse and dense. Thus, as shown in FIG. 5B, grid lines having two types of grid-line spacing are displayed in a mixed state in the image display area 61. The operator selects an arbitrary intersection 62*a* on the grid line 62, that is, a grid point, as a control point, and then performs an operation of dragging and dropping the control point in an arbitrary direction and to an arbitrary position.

Here, as shown in FIG. 4A, the image deformation range is a range of four adjacent blocks. Therefore, the image deformation range is wide in an area where the grid-line spacing is wide, and the image deformation range is narrow in an area where the grid-line spacing is narrow. Therefore, by appropriately determining the coarse and dense grid point ranges and the grid-line spacing in each of the ranges in accordance with the desired amount and range of deformation on the image, the work efficiency of image alignment can be improved compared to the conventional device.

Although the imaging mass spectrometer of the above embodiment has performed the characteristic image deformation processing as described above in the superimposition of an optical microscopic image such as a stained image and a mass spectrometric image, it is clear that the present invention can also be applied in the superimposition of a mass spectrometric image and an image for the same sample, the image being obtained by other measurement, for example, Raman spectroscopic imaging, infrared spectroscopic imaging, X-ray analytical imaging, surface analytical imaging using a particle beam such as an electron beam or an ion beam, or an image obtained by surface analytical imaging using a probe such as a scanning probe microscope (SPM). The present invention is not limited to an imaging mass spectrometer but is also effective in the superimposition of different images obtained for the same sample by using various measurement methods as described above.

Note that the "same sample" here is not necessarily the same sample. For example, even different samples may be treated as substantially the same sample so long as the samples are adjacent piece samples in continuous piece samples formed by slicing a biological tissue into very thin pieces. In such a case, it is sufficiently useful to apply the present invention in the superimposition of the images respectively obtained for different samples that can be considered as the same sample.

Further, the above embodiment is merely an example of the present invention, and it is natural that, even when modification, correction, and addition are made as appropriate in the scope of the gist of the present invention in addition to the various modifications described above, those are included in the scope of claims of the present invention.

REFERENCE SIGNS LIST

1 . . . Imaging Mass Spectrometry Unit
2 . . . Optical Microscopic Image Acquiring Unit
3 . . . Data Processing Unit
31 . . . Data Collector
32 . . . Data Storage Section
321 . . . Spectral Data Storage Area
322 . . . Optical Image Data Storage Area
33 . . . Image Creator
34 . . . Optical Image Creator
35 . . . Image Superimposition Processor
351 . . . Image Display Processor
352 . . . Image Deformation Range Specification Receiving Section
353 . . . Grid Spacing Adjustment Receiving Section
354 . . . Image Deformation Processor
4 . . . Input Unit
5 . . . Display Unit
60 . . . Image Superimposition Work Screen
61 . . . Image Display Area
62 . . . Grid
63 . . . Grid Spacing Adjustment Slider
64 . . . Image Deformation Range "SET" Button
65 . . . Image Deformation Range "SELECT" Button
66 . . . "SAVE" Button

The invention claimed is:

1. An imaging data processing device that has an input unit and a display unit as user interfaces and processes first imaging data obtained by performing a measurement on a plurality of minute areas in a two-dimensional area on a sample by a first measurement method, and second imaging data obtained by performing a measurement on a range including at least a part of the two-dimensional area on the sample by a second measurement method different from the first measurement method, the device comprising:
   a) an image display processor configured to superimpose and display a first image created on a basis of the first imaging data and a second image created on a basis of the second imaging data over a substantially same range on a sample in a screen of the display unit, and superpose and display grid points at predetermined spacing on the superimposed images;
   b) a deformation range specification receiving section configured to allow a user to specify an image deformation range by an operation via an input unit on the superimposed images with the grid points superposed and displayed by the image display processor; and
   c) an image deformation processor configured to accept the user's selection of a grid point included in the image deformation range specified by the deformation range specification receiving section from among the grid points superposed and displayed on the superimposed images by the image display processor via the input unit and the user's operation of moving the selected grid point on the superimposed images, the processor being configured to deform, in accordance with the selection and the moving operation, an image within the image deformation instructed range in one of the two images that are superimposed and displayed.

2. An imaging data processing device that has an input unit and a display unit as user interfaces and processes first imaging data obtained by performing a measurement on a plurality of minute areas in a two-dimensional area on a sample by a first measurement method, and second imaging data obtained by performing a measurement on a range including at least a part of the two-dimensional area on the sample by a second measurement method different from the first measurement method, the device comprising:
   a) an image display processor configured to superimpose and display a first image created on a basis of the first imaging data and a second image created on a basis of the second imaging data over the substantially same range on a sample in a screen of the display unit, and superpose and display grid points on the superimposed images;
   b) a grid-point spacing specification receiving section configured to allow a user to specify spacing between the grid points for each of different areas on the image; and
   c) an image deformation processor configured to accept a user's selection of a grid point among grid points having spacing specified by the grid-point spacing specification receiving unit and superposed and displayed on the superimposed images by the image display processor, and the user's operation of moving the selected grid point on the image, the processor being configured to deform, in accordance with the selection and the moving operation, an image in a predetermined range in one of the two images that are superimposed and displayed.

3. The imaging data processing device according to claim 1, wherein
   the first measurement method is mass spectrometric imaging using matrix-assisted laser desorption/ionization, and
   the second measurement method is a method of staining or fluorescently labeling a sample and observing the sample with a microscope.

4. The imaging data processing device according to claim 2, wherein
   the first measurement method is mass spectrometric imaging using matrix-assisted laser desorption/ionization, and the second measurement method is a method of staining or fluorescently labeling a sample and observing the sample with a microscope.

\* \* \* \* \*